Patented Nov. 8, 1938

2,136,332

UNITED STATES PATENT OFFICE 2,136,332

VULCANIZATION OF RUBBER

Albert M. Clifford, Stow, Ohio, assignor to Wingfoot Corporation, Wilmington, Del., a corporation of Delaware No Drawing. Application October 2, 1935, Serial No. 43,287

11 Claims. (Cl. 18—53)

This invention relates to a new class of compounds which have been found valuable as accelerators of the vulcanization of rubber. More particularly, the invention relates to derivatives of mercaptothiazoles which may be called aromatic urethanes of mercaptothiazoles. They may also be called aromatic carbamyl 1-thiazyl sulphides and are represented by the formula

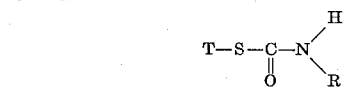

wherein T is a 1-thiazyl radical and R is an aromatic radical.

A more preferred class of compounds of the invention are the 1-arylene thiazyl aromatic carbamyl sulphides, represented by the formula

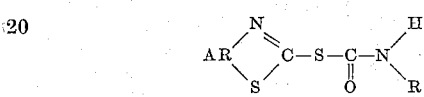

wherein AR is an ortho arylene group of the benzene and naphthalene series and R is an aromatic radical of the benzene and naphthalene series.

It is an object of this invention to provide a new class of compounds. It is a further object to provide a new class of mercaptothiazole derivatives which are good semi-ultra accelerators of vulcanization, particularly when activated by basic nitrogen-containing accelerators such as diphenylguanidine. Other objects and advantages will become apparent as the description of the invention proceeds.

The compounds of the invention are conveniently prepared by reacting a mercaptothiazole with an aromatic iso cyanate such as phenyl iso cyanate. The reaction proceeds with facility and is carried out simply by bringing the mercaptothiazole and iso cyanate together, preferably with heating, although extraneous heating is not necessary in all cases. The product is easily purified and is obtained in a high yield.

Further illustrating the invention is the preparation of phenyl carbamyl benzothiazyl 1-sulphide which is prepared by heating a mixture of 16.7 grams of mercaptobenzothiazole and 17.5 grams of phenyl iso cyanate for a period of 5 hours at a temperature provided by a boiling water bath. The resulting product is washed with ether in order to remove soluble impurities and is then triturated three successive times with a 5% aqueous sodium carbonate solution. The final product, phenyl carbamyl benzothiazyl 1-sulphide, or as it may be called, the phenyl urethane of mercaptobenzothiazole, melts at 125–127° C. and upon analysis is found to contain an average nitrogen content of 9.70% and an average sulphur content of 21.85%. The theoretical nitrogen and sulphur contents for phenyl carbamyl benzothiazyl 1-sulphide are, respectively, 9.80% and 22.4%. The equation representing the reaction is as follows:

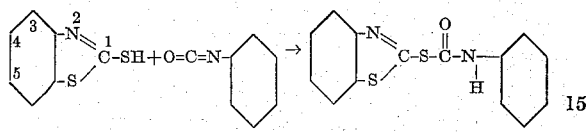

Other mercaptothiazoles which may be reacted with aromatic iso cyanates in the practice of the invention are the 1-mercapto naphthothiazoles, alpha and beta, the 1-mercapto xylyl thiazoles, 1-mercapto 4-nitro benzothiazole, 1-mercapto 5-nitro benzothiazole, 1-mercapto 4-chlor benzothiazole, 1-mercapto 4-nitro 5-chlor benzothiazole, 1-mercapto 3-phenyl benzothiazole, 1-mercapto 3-methyl benzothiazole, 1-mercapto 5-hydroxy benzothiazole, 1-mercapto 3-methoxy benzothiazole, 1-mercapto 5-ethoxy benzothiazole, 1-mercapto 5-amino benzothiazole, 5-nitro 3-methyl 1-mercapto benzothiazole, 1-mercapto 3-phenyl thiazole, 1-mercapto thiazole, 1-mercapto 3-4-dimethyl thiazole, and other halogen-, nitro-, hydroxy-, alkoxy-, and amino-substituted arylene mercaptothiazoles.

Similarly, other aromatic iso cyanates may be reacted with the mercapto thiazoles in the practice of the invention, examples being the ortho and para tolyl iso cyanates, the alpha and beta naphthyl iso cyanates, the ortho and para nitrophenyl iso cyanates, the xylyl iso cyanates, the cresyl iso cyanates, ortho and para hydroxy phenyl iso cyanates, ortho and para phenetidyl iso cyanates, ortho and para anisyl iso cyanates, etc.

Other illustrative aromatic carbamyl thiazyl sulphides are para tolyl carbamyl benzothiazyl 1-sulphide, p-anisyl carbamyl 5-nitro benzothiazyl 1-sulphide, ortho phenetidyl carbamyl 5-chlor benzothiazyl 1-sulphide, para nitro phenyl carbamyl alpha naphthyl thiazyl 1-sulphide, para hydroxy phenyl carbamyl 6-methyl benzothiazyl 1-sulphide, and the like.

The compounds to which the invention relates may be employed as accelerators of vulcanization in substantially any of the standard rubber formulae, one found particularly satisfactory being the following:

|  | Parts by weight |
|---|---|
| Extracted pale crepe rubber | 100 |
| Zinc oxide | 5 |
| Sulphur | 3 |
| Stearic acid | 1.5 |
| Accelerator | as indicated |

Results obtained by the use of this formula are summarized in the following table:

| Cure in mins. at °F. | Ult. tensile kgs/cm.² | Max. elong. in percent | Modulus in kgs/cm.² | |
|---|---|---|---|---|
| | | | 500% | 700% |
| *Phenyl carbamyl benzothiazyl 1-sulphide, 0.5 part by weight* | | | | |
| 20/260 | 12 | 960 | 4 | 6 |
| 40 | 54 | 960 | 6 | 14 |
| 60 | 73 | 890 | 10 | 25 |
| 80 | 81 | 825 | 12 | 33 |
| *Phenyl carbamyl benzothiazyl 1-sulphide, 0.5 part, diphenylguanidine, 0.2 part* | | | | |
| 20/260 | 76 | 910 | 10 | 24 |
| 40 | 150 | 800 | 22 | 83 |
| 60 | 206 | 750 | 37 | 150 |
| 80 | 225 | 730 | 47 | 192 |

The novel compounds to which the invention relates thus possess valuable properties as accelerators of vulcanization. As disclosed in the preceding data, they may be employed either by themselves or in conjunction with activators of the nature of basic nitrogen-containing accelerators, of which examples are diphenyl-guanidine, diortho tolyl guanidine, 2-4-diamino diphenyl amine, p-p'-diamino diphenyl methane, diphenylguanidine neutral phthalate, butyl ammonium oleate, and the like. With nitrogen-containing basic accelerators they are good delayed action accelerators.

It is intended that the patent shall cover, by suitable expression in the appended claims, whatever features of patentable novelty reside in the invention.

What I claim is:

1. A process of vulcanizing rubber which comprises vulcanizing it in the presence of phenyl carbamyl benzothiazyl 1-sulphide.

2. A process of vulcanizing rubber which comprises vulcanizing it in the presence of a compound having the formula

wherein T is a 1-benzothiazyl radical and R is an aromatic radical of the benzene series.

3. A process of vulcanizing rubber which comprises vulcanizing it in the presence of a compound having the formula

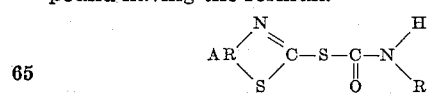

wherein AR is an ortho arylene group of the benzene and naphthalene series and R is an aromatic radical of the benzene and naphthalene series.

4. A process of vulcanizing rubber which comprises vulcanizing it in the presence of a compound having the formula

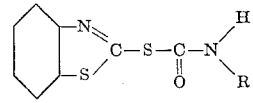

wherein R is an aromatic radical of the benzene and naphthalene series.

5. A rubber product which has been vulcanized in the presence of phenyl carbamyl benzothiazyl 1-sulphide.

6. A rubber product which has been vulcanized in the presence of a compound having the formula

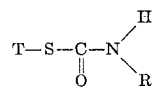

wherein T is a 1-benzothiazyl radical and R is a phenyl radical.

7. A rubber product which has been vulcanized in the presence of a compound having the formula

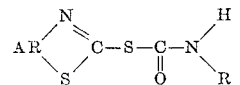

wherein AR is an ortho arylene group of the benzene and naphthalene series and R is an aromatic radical of the benzene and naphthalene series.

8. Phenyl carbamyl benzothiazyl 1-sulphide.

9. A compound having the formula

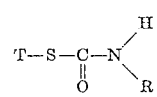

wherein T is a 1-benzothiazyl radical and R is a phenyl radical.

10. A compound having the formula

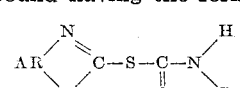

wherein AR is an ortho arylene group of the benzene and naphthalene series and R is an aromatic radical of the benzene and naphthalene series.

11. A compound having the formula

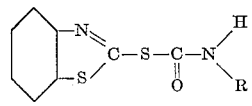

wherein R is an aromatic radical of the benzene and naphthalene series.

ALBERT M. CLIFFORD.